United States Patent
Rao et al.

(10) Patent No.: US 8,078,506 B1
(45) Date of Patent: Dec. 13, 2011

(54) METHOD FOR MOBILE ELECTRONIC COMMERCE

(75) Inventors: Raman K. Rao, Palo Alto, CA (US);
Sunil K. Rao, Palo Alto, CA (US);
Sanjay K. Rao, Palo Alto, CA (US)

(73) Assignee: IP Holdings, Inc., Palo Alto, CA (US)

( * ) Notice: Subject to any disclaimer, the term of this patent is extended or adjusted under 35 U.S.C. 154(b) by 0 days.

(21) Appl. No.: 09/677,954

(22) Filed: Oct. 2, 2000

Related U.S. Application Data

(63) Continuation-in-part of application No. 09/281,739, filed on Jun. 4, 1999, now Pat. No. 6,169,789, which is a continuation-in-part of application No. 08/764,903, filed on Dec. 16, 1996, now abandoned.

(51) Int. Cl.
*G06F 17/30* (2006.01)
(52) U.S. Cl. .................................. 705/27.2; 705/26.62
(58) Field of Classification Search .................... 705/26, 705/27, 14, 27.2, 26.62
See application file for complete search history.

(56) References Cited

U.S. PATENT DOCUMENTS

| | | | |
|---|---|---|---|
| 4,465,401 A | 8/1984 | Stoddord et al. |
| 4,675,653 A | 6/1987 | Priestley |
| 5,195,130 A | 3/1993 | Weiss et al. |
| 5,379,341 A | 1/1995 | Wan |
| 5,410,738 A | 4/1995 | Diepstraten et al. |
| 5,465,401 A | 11/1995 | Thompson |
| 5,513,242 A | 4/1996 | Mukerjee et al. |
| 5,517,553 A | 5/1996 | Sato |
| 5,539,391 A | 7/1996 | Yuen |
| 5,555,258 A | 9/1996 | Snelling et al. |
| 5,559,794 A | 9/1996 | Willis et al. |
| D374,675 S | 10/1996 | Sakai et al. |
| 5,565,929 A | 10/1996 | Tanaka |
| 5,566,205 A | 10/1996 | Delfine |
| 5,577,118 A | 11/1996 | Sasaki et al. |

(Continued)

FOREIGN PATENT DOCUMENTS

WO    WO 92/03884    3/1992

(Continued)

OTHER PUBLICATIONS

M2Presswire, "Ram mobile data: Ram mobile data launches fixed cost, real-time POD job despatch & messaging solution", May 11, 1999.*

(Continued)

*Primary Examiner* — Mark Fadok
(74) *Attorney, Agent, or Firm* — Levine Bagade Han LLP

(57) ABSTRACT

A method for having a mobile price transaction system including comparisons. The system obtains information about prices and transactions involving products and services in real time over a wireless link. The actions include making a price comparison inquiry to a central server for the product, service, or price information. The inquiry is formatted in the central server for transmission to sources of the information such as vendors or their web sites. After receiving a response from the sources, the response is suitably formatted and is displayed on the mobile unit. The information will often be available locally on the central server, but the present invention includes commanding remote sources to provide an action such as a response, including a response at a desired time or for desired conditions.

14 Claims, 7 Drawing Sheets

U.S. PATENT DOCUMENTS

| | | | | |
|---|---|---|---|---|
| 5,595,264 | A * | 1/1997 | Trotta, Jr. | 186/56 |
| 5,640,002 | A * | 6/1997 | Ruppert et al. | 235/462.46 |
| 5,664,110 | A * | 9/1997 | Green et al. | 705/26 |
| 5,918,211 | A * | 6/1999 | Sloane | 705/16 |
| 5,978,833 | A * | 11/1999 | Pashley et al. | 709/200 |
| 6,016,476 | A * | 1/2000 | Maes et al. | 705/1 |
| 6,123,259 | A * | 9/2000 | Ogasawara | 235/380 |
| 6,134,548 | A * | 10/2000 | Gottsman et al. | 707/5 |
| 6,169,498 | B1 * | 1/2001 | King et al. | 340/686.1 |
| 6,169,789 | B1 * | 1/2001 | Rao et al. | 379/110.01 |
| 6,179,206 | B1 * | 1/2001 | Matsumori | 235/383 |
| 6,199,099 | B1 * | 3/2001 | Gershman et al. | 709/203 |
| 6,230,970 | B1 * | 5/2001 | Walsh et al. | 235/379 |
| 6,305,607 | B1 * | 10/2001 | Katz et al. | 235/462.45 |
| 6,318,636 | B1 * | 11/2001 | Reynolds et al. | 235/472.01 |
| 6,327,570 | B1 * | 12/2001 | Stevens | 705/7 |
| 6,354,496 | B1 * | 3/2002 | Murphy et al. | 235/383 |
| 6,356,905 | B1 * | 3/2002 | Gershman et al. | 707/10 |
| 6,366,771 | B1 * | 4/2002 | Angle et al. | 455/414.1 |
| 6,401,085 | B1 * | 6/2002 | Gershman et al. | 707/4 |
| 6,404,772 | B1 * | 6/2002 | Beach et al. | 370/443 |
| 6,405,924 | B1 * | 6/2002 | Shah | 235/462.08 |
| 6,502,685 | B1 * | 1/2003 | Klugman et al. | 194/208 |
| 6,523,061 | B1 * | 2/2003 | Halverson et al. | 709/202 |
| 6,549,891 | B1 * | 4/2003 | Rauber et al. | 705/28 |
| 6,587,835 | B1 * | 7/2003 | Treyz et al. | 705/14 |
| 6,604,681 | B1 * | 8/2003 | Burke et al. | 235/383 |
| 6,845,370 | B2 * | 1/2005 | Burkey et al. | 707/3 |
| 6,860,424 | B1 * | 3/2005 | Philyaw et al. | 235/462.32 |
| 6,965,682 | B1 * | 11/2005 | Davis et al. | 382/100 |
| 6,965,868 | B1 * | 11/2005 | Bednarek | 705/7.14 |
| 7,008,456 | B1 * | 3/2006 | Tanaka et al. | 726/35 |
| 7,035,856 | B1 * | 4/2006 | Morimoto | 707/10 |
| 7,065,501 | B1 * | 6/2006 | Brown et al. | 705/28 |
| 7,072,850 | B1 * | 7/2006 | Van Luchene | 705/14 |
| 7,114,656 | B1 * | 10/2006 | Garver | 235/462.46 |
| 7,162,434 | B1 * | 1/2007 | Walker et al. | 705/14 |
| 7,191,135 | B2 * | 3/2007 | O'Hagan | 704/270.1 |
| 7,348,961 | B1 * | 3/2008 | Shneidman | 345/156 |
| 7,392,945 | B1 * | 7/2008 | Philyaw | 235/383 |
| 2001/0034659 | A1 * | 10/2001 | Kobayashi | 705/26 |
| 2001/0055978 | A1 * | 12/2001 | Herrod et al. | 455/517 |
| 2002/0002513 | A1 * | 1/2002 | Chiasson | 705/27 |
| 2002/0016804 | A1 * | 2/2002 | Wasilewski | 707/530 |
| 2002/0035560 | A1 | 3/2002 | Sone | |
| 2003/0055974 | A1 * | 3/2003 | Brophy et al. | 709/227 |

FOREIGN PATENT DOCUMENTS

| | | |
|---|---|---|
| WO | WO92/03884 B1 | 3/1992 |
| WO | WO-96/38964 A1 * | 12/1996 |
| WO | WO99/26396 A1 * | 5/1999 |

OTHER PUBLICATIONS

RFIF tag1, "Sensormatic enters new market with first RFID in-store inventory management instalation at Movie Gallery", *Business Wire*, dated May 23, 2000.

U.S. Appl. No. 08/764,903, filed Dec. 16, 1996 in the name of Rao et al., Non-final Office Action mailed Mar. 2, 1998.

U.S. Appl. No. 09/281,739, filed Jun. 4, 1999 in the name of Rao et al., Notice of Allowance mailed Apr. 25, 2000.

U.S. Appl. No. 10/852,305, filed May 24, 2004 in the name of Rao et al., Non-final Office Action mailed Jun. 2, 2010.

* cited by examiner

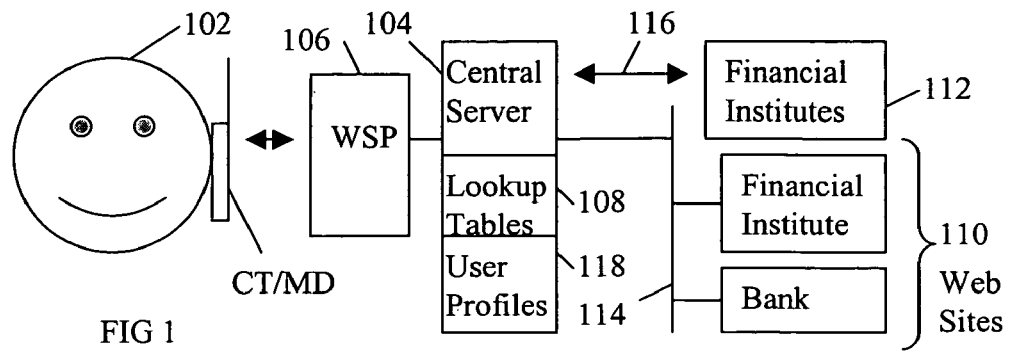
FIG 1
| Currency | Target 1 | Target 2 | Target 3 |
|---|---|---|---|
| US dollars | British pounds | French francs | Indian rupees |
| | | | |
| | | | |
FIG. 2
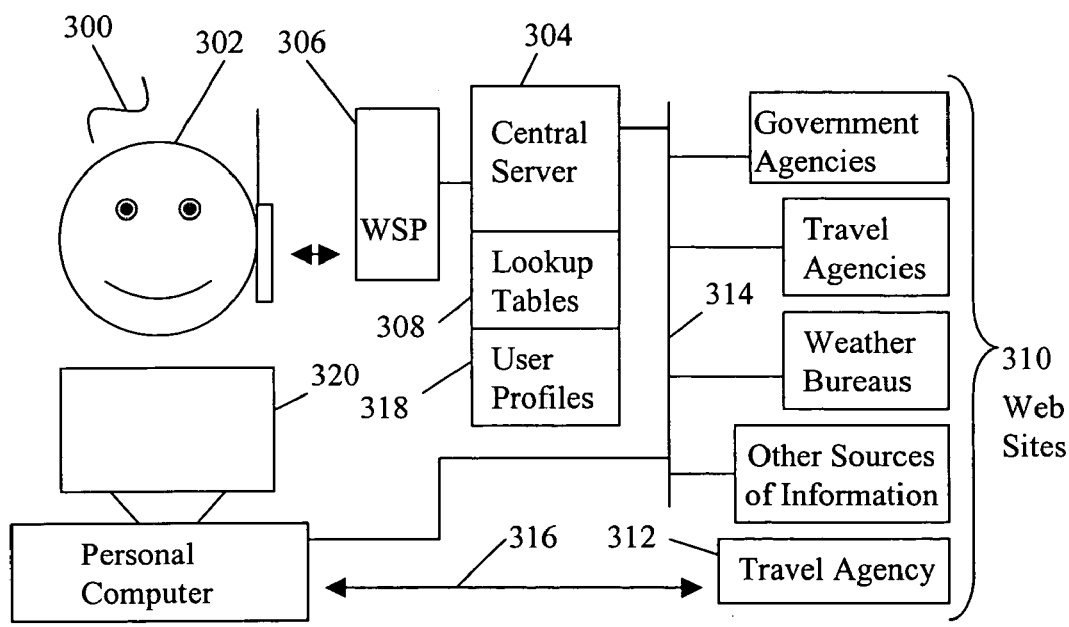
FIG. 3

METHOD FOR MOBILE ELECTRONIC COMMERCE

CROSS REFERENCE TO RELATED APPLICATIONS

The present application is a continuation-in-part of application entitled INTELLIGENT KEYBOARD SYSTEM, Ser. No. 09/281,739, filed Jun. 4, 1999, U.S. Pat. No. 6,169,789 which is a continuation-in-part application of a now abandoned application entitled A SYSTEM LEVEL SCHEME TO CONTROL INTELLIGENT APPLIANCES, Ser. No. 08/764,903 filed Dec. 16, 1996 now abandoned.

BACKGROUND OF THE INVENTION

Purchasing transactions are an integral part of our way of life, such as in trade and travel, and affect everyone personally. However, in the prior art, purchasing transactions are often hit or miss actions with price as the primary and most often the only determinant factor. Small changes in a price, for example, will often create very large changes in the perceived value of a business transaction, and will strongly influence trade, tourism, and most other facets of life. However, especially with respect to impulse purchases, price comparisons must be fast, accurate and convenient to have maximum effect and often are not adequate in this respect.

Ideally, details of a comparison will be transparent to the user, with the user seamlessly having the ability to take advantage of a bargain or to make a price comparison under the exact conditions the user chooses. In the prior art purchasing transactions were susceptible to manipulation. The buyer often received misleading, incomplete or even no information regarding other factors that are as important as price. The fully informed and intelligent selection of a specific merchant, vendor, or service provider requires the customer to evaluate extensive collateral information and reach a timely decision. This collateral information may include choice of color, size, and feel in the environment of expected use, weight, warranty, quality, reliability, and availability. The reputation of the vendor, service, return privileges, manufacturer, make, year of manufacture, product or service attributes, expected features in next year models, sales tax, and shipping costs are also important factors in a purchasing decision.

The factors that the customer should consider and weigh are many, and are not always amenable to intelligent processing on the fly. In the prior art the comparison of prices was conducted by a query to an individual web site of the vendor or the vendors belonging to that particular group. The answer was parsed for presentation on a stationary device or a mobile device without prioritizing, categorizing and ranking. Without the aid of comprehensive algorithms and software to fully optimize the individual value proposition, the customer may make a bad decision, generating a return of the merchandise or cancellation of the service.

Expeditious, timely and value enhancing transactions are in the best interest of everyone; customers, vendors and governments. Trade and tourism are often adversely affected if users expect more or believe they received less than they are entitled to due to inadequate information and poor communication.

Presently comparisons are often made in an ad hoc manner, such as by chance or by advertising forced on the consumer. These methods are inconvenient, annoying, costly, and may provide incomplete information for making a decision, thus dissatisfying consumers and also vendors who must deal with the resulting cost of product returns or the loss of repeat customers. An example is in precious metals, where gold coins are sometimes advertised as weighing a certain number of avoirdupois ounces. Without knowing the ratio of a troy ounce (480 grains) to an avoirdupois ounce (437.5 grains), the consumer would have to guess at the value.

Knowledgeable advisors may charge relatively excessive rates, defeating the reason for getting the advice. It is in the best interest of both a government wishing to encourage trade and tourism and of a user desiring trade or tourism to have simple, reliable price comparisons and transactions.

Standard methods for making comparisons, rather than providing a benefit to the government and users seeking trade or tourism, create confusion and uncertainty. This is especially true, as stated before, of cases involving ambiguous values, for example, unfamiliar systems of units of weights and measures, currencies, quality standards, cultural standards and so forth.

In addition, to foster competition in a free economy it is necessary that vendors not cooperate to set prices. Thus there is a prohibition in having one organization as a standard setter or clearinghouse of prices, if the effect is to restrict competition. Even in a competitive market, the consumer faces a daunting task if he/she has to conduct independent research to secure the best price and value on any given product or service. The consumer generally desires access to an unbiased way of freely and expeditiously conducting a price search based on chosen criteria and optimizing the acquisition cost to obtain a value that meets individual parameters. However, the search must be easily and quickly accomplished.

In the prior art items are often tagged with a label that has a bar code attached. This requires the act of scanning by the customer or sales clerk. Some items, like garments, have tags sewn or clipped on that may alert by audible sound if the tag is not removed or if the item is being removed without authorization. These methods are often not satisfactory, since they act only to prevent theft with no direct benefit to the customer.

In the prior art, mobile communication devices such as a cellular telephone/mobile device (CT/MD) do not have spread sheet capabilities, since mobile devices such as a CT/MD have data entry and viewing limitations. There is a longstanding need for providing spreadsheets with a CT/MD.

SUMMARY OF THE INVENTION

It is an object of the present invention to provide a price comparison and transaction system for supplying convenient, accurate and reliable information to a user, such as by using a mobile unit, and for simplifying the comparisons of values. This is especially true of ambiguous values, such as the English system short ton, which is 2000 pounds, and the English system long ton, which is 2240 pounds. The English ton can also represent several different units of volume in shipping, so a reference to a ton should cause the comparison system to develop a context to determine the system to use, provide detailed information about these variants, or provide prompting such as <what system do you want?>. Examples of ambiguous values are often found in shipping, where a shipping ton may be 35 cubic feet of material, 40 cubic feet of material, or 100 cubic feet of space, but is seldom 2000 or 2240 pounds. One would want to know that such differences exist, and to know which system for defining a ton is intended. It is an object of the present invention to determine these differences by context, wherever practical, or to provide suggestions if the context is unclear.

In an embodiment of the present invention, a mobile device, such as an Intelligent Keyboard, IK, a hand held computer, lap top computer, cellular phone, or other wireless device, acts as a price comparison/transaction station. These functions may also be implemented on a stationary device (SD), such as a personal computer (PC), even though the primary purpose of the present invention is to allow a high degree of mobility in connection with the desired action and is optimized for mobile devices. The comparison/transaction station provides for the acquisition of comparative pricing information and allows comparisons to be completed using a source of information, such as from web sites, that can be relied on by the consumer, the seller of the desired product or service, and other vendors. Information concerning a desired action may be entered in any language, with the request being forwarded to a central server via a wireless link for processing. At the central server, a matching routine, such as referrals to a lookup table, allows the desired action to be parsed into a more suitable form for processing. One example of a more suitable form is in language conversion, for example, from English to German or vice versa. The information might be in English, but desired in German. This could be translated, for a German speaker, to an equivalent German request, and might be answered in German text or delivered by a synthesized German voice.

In a preferred embodiment, the transaction to be used including price comparisons, along with the type of output desired, is first identified or determined for action by the system. The central processor determines the latest information relating to the desired action, such as by interrogating a web site, and calculates, for example, values for a service/product. Other information the user may wish is supplied, such as a price history, or likelihood of a better price from another source. Flags may be set for regularly interrogating a site and notifying the user of an event triggering a need which has been expressed by the user, such as about a sale on desired items meeting criteria the user has set.

Other objects, features and advantages of the present invention will become apparent from the following detailed description when taken in conjunction with the accompanying drawings.

BRIEF DESCRIPTION OF THE EMBODIMENTS OF THE INVENTION

The accompanying drawings, which are incorporated in and form a part of this specification, illustrate embodiments of the invention and, together with the description, serve to explain the principles of the invention:

FIG. 1 shows an embodiment of a mobile unit used with a price comparison or transaction system of the present invention.

FIG. 2 shows an embodiment of a table for entering the currencies desired to be used in a exchange rate comparison system.

FIG. 3 shows an embodiment of a price comparison system illustrating how information is obtained from remote sources, such as travel agencies.

DETAILED DESCRIPTION OF THE PREFERRED EMBODIMENTS

Figure 4:
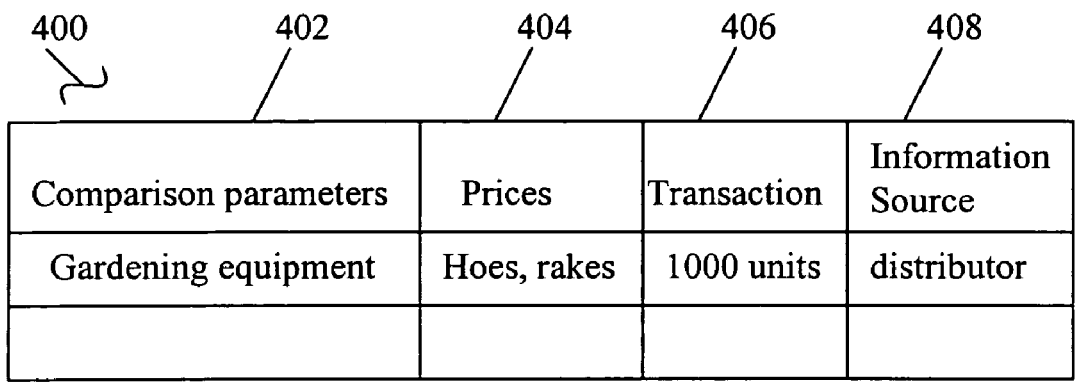
FIG. 4 shows an embodiment of a price comparison request table of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The embodiments that follow relate to a wireless unit for making transactions. Transactions as used herein include comparisons. The embodiments include stationary units as well, such as personal computers (PCs). Further, the price comparison inquiry or request can be in any form of intelligence, such as key entries from a keyboard, voice in any language, graphics such as a key click on a graphic page, mouse clicks on a view, or even depressions of a foot pedal.

In the present invention, the price comparison of a product, such as a book, uses special software and algorithms resident on a local server or Internet Server. The servers in turn scour the available web sites for the data and present it in rank order, such as least price first. There is no bias given to any site. The CT/MD user can determine the search algorithm used. The same is done for services, such as plumbers, dentists, doctors, etc. The access to the Internet by the CT/MD may be through a wireless service provider (WSP) or through a Multi-channel Multiplexing Transmitter Receiver (MMTR).

In the present invention, a user desiring to make a comparison or request a transaction including transactions relating to a comparison makes a wireless call to the central server of the present invention. The central server receives the request for the action, and parses the necessary information to service the call. Any information may be parsed, but will normally include an identification (ID) of the user, information about the language, the type of action forming the basis of the action, the number of actions desired, and any parameters that may be pertinent. The parameters involved may include, for example, inputting a limit on the values for a comparison, such as not more than a certain amount in US dollars. In another example of a parameter, an action might depend on a value being greater than or lesser than a preset amount of money, goods, or services for a transaction to be authorized.

FIG. 1 illustrates an embodiment of the present invention. In FIG. 1, a user with a cellular telephone/mobile device (CT/MD) 102 communicates with a central server 104 through, for example, wireless service provider 106. Server 104 uses lookup tables 108 and a user profile in stored user profiles 118 to set an environment for the specific action. The environment set includes the ID of the user, the language being used, the type of action, and the value expected from a transaction or comparison, along with flags for any limits desired by the user. With the =environment set, the central server obtains the desired information from vendor web sites 110 over the interne 114 or directly from the vendors 112, such as by automatic email 116. The information gathered is then inserted into the environment set up for the user, and further processed, such as by converting to the language of the user or adjusting the format as desired by the user. Depending on the results obtained and the urgency, the user is notified by phone, email, or other means, such as the US postal service.

FIG. 2 is an embodiment of the comparison and transaction system of the present invention showing how a table 200 of values is used to identify the source and value of actions being inquired about or required by the user. In FIG. 2, a template for the table 200 has been created, either from the central server or from software in the mobile device being used for inputting a request. As shown, the template allows entry of a requirement 202 for an action whose type has been determined, in this case a currency, and also allows entry of parameters as targets 204, 206, and 208. As an example, US dollars are to be compared to British pounds 204, French francs 206, and Indian rupees 208. While the table shows only three targets, it will be understood that any number of targets could be involved.

FIG. 3 shows an embodiment of the comparison and transaction system 300 of the present invention. In FIG. 3 shows a user with a mobile device (MID) 302. This could also be a stationary device (SD) such as a personal computer 320 as shown. The user with the mobile device 302 communicates a price comparison request or a request for a desired transaction to a central server 304 through a wireless service provider (WSP) 306. As described above, the central server 304 sets a user environment, such as the user ID, language being used, field of the comparisons desired, in this case currencies, and the mode of communication from lookup table 308 and user profiles 318. Answers will be sent back to the mobile device or returned by email or otherwise, as indicated by the environment. The central server interrogates vendor locations 310 for the information desired over a network connection 314 such as the Internet, or directly communicates with sources such as travel agency 312 over a communication link 316. Locations 310 or 312 respond with the desired information, or with some other information, such as a location with more current or pertinent information. The central server 304 processes the information received from the locations 310 and 312, such as by parsing the information to determine the language used, and determines how to communicate the information to the user, such as through MD 302. If new information relating to the user has been developed in the environment, it is used to update the user profile in the user profiles 318.

FIG. 4 shows an embodiment of a price comparison system of the present invention showing an alternative version of the table 200 of FIG. 2. In FIG. 4, a template for building table 400 of comparison parameters 402 allows data to be assembled such as prices 404, transaction 406 and information source 408, such as the name of a vendor supplying a price. In the example of this embodiment, gardening equipment 402 comparisons are desired, with the specific items being hoes and rakes 404. Transaction 406 for 1000 units is requested, and the information source is to be a distributor 408.

Figure 5:
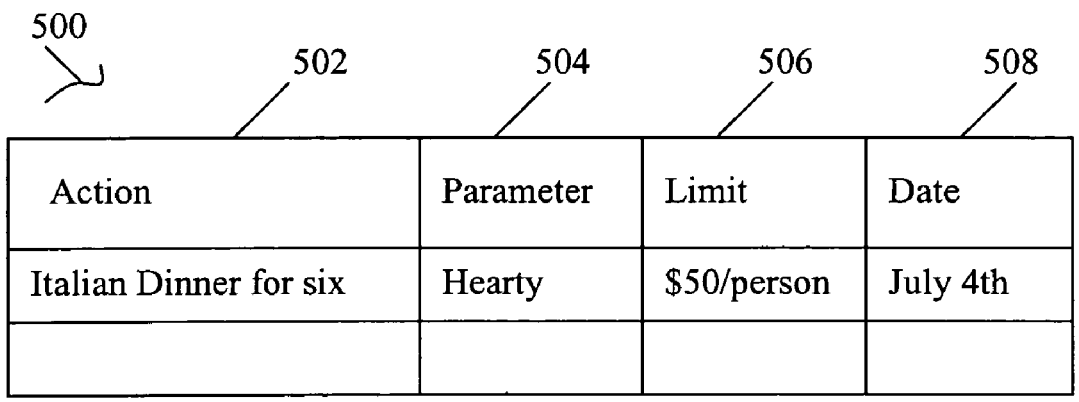
FIG. 5 shows an alternate embodiment of a price comparison table of the present invention.

FIG. 5 shows another embodiment of the comparison system of the present invention showing a table 500 for entry of information, such as product information or a transaction. In FIG. 5, table 500 relates an action 502 to a user input in the form of a parameter 504. Table 500 also allows the entry of a limit 506 above which (or below which, in other cases) an action is not desired or is not to be completed, and the date 508 on which the action is completed. Here, an Italian dinner for six is specified as the action 502, with hearty being the parameter 504; that is, hearty portions. A limit 506 of $50.00 per person is imposed, and the date 508 desired is July 4.

Figure 6:
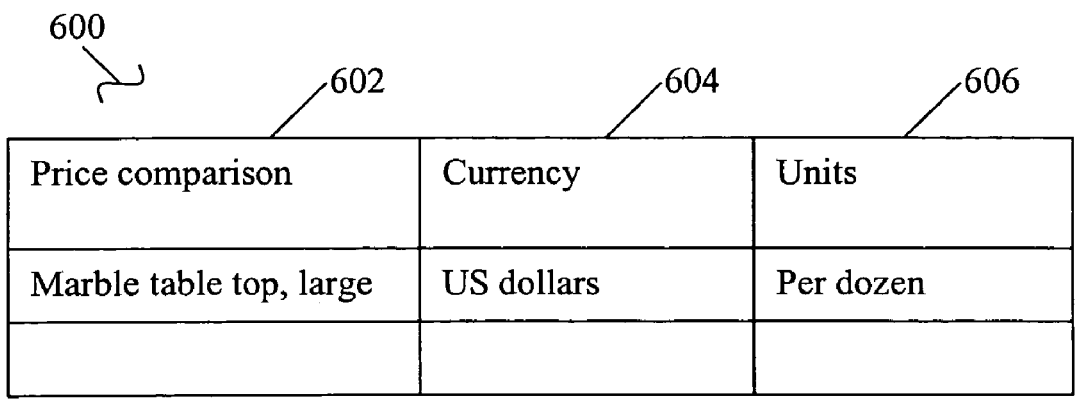
FIG. 6 shows an embodiment illustrating how the prices of commodities for a specific currency might be parameterized.

FIG. 6 shows another embodiment of the price comparison and transaction system of the present invention showing a table 600. In FIG. 6, table 600 allows, for example, entries for a price comparison 602, currency to be compared 604 with the units 606. Clearly, as shown in FIG. 2 and again in FIG. 4, entries, such as in table 600, could be expanded to include other desired information, such as the current date, time at which a comparison or transaction is desired, and so on.

Figure 7:
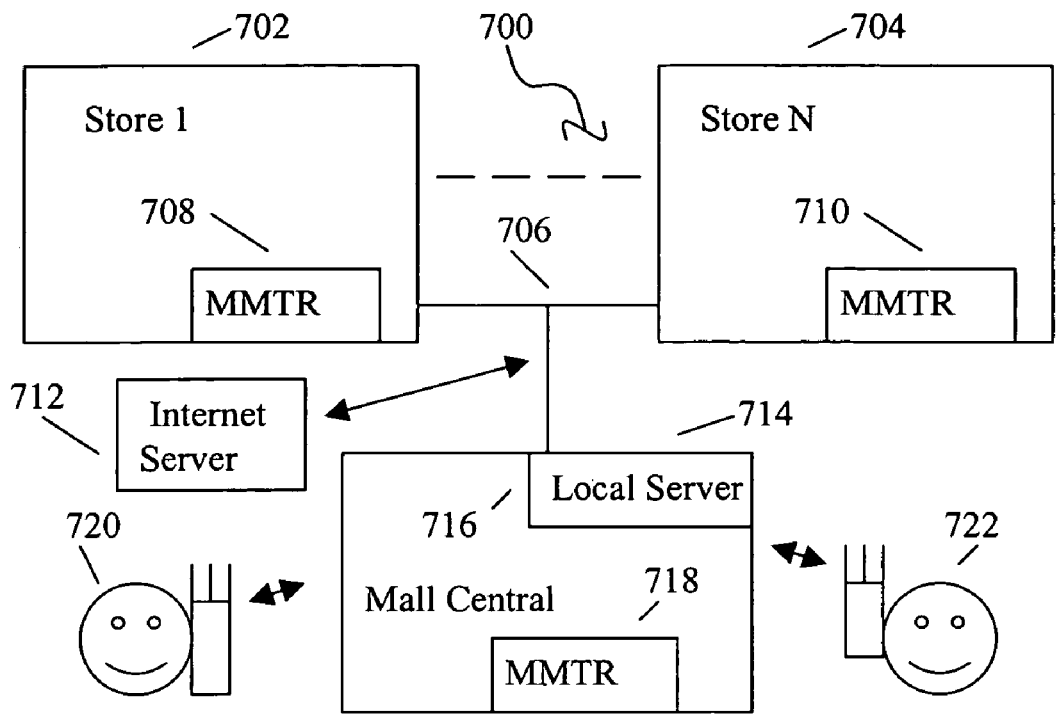
FIG. 7 illustrates a mobile electronic commerce system of the present invention showing how the system would be employed with the shops in a shopping mall.

FIG. 7 illustrates a mobile electronic commerce system 700 of the present invention. In FIG. 7, the shops in a shopping mall, such as Store 1 702 and Store N 704, may have their own individual MMTR such as MMTR 708 in Store 1 702 or MMTR 710 in Store 2 communicating over a network 706 such as the Internet. The network 706 may also be a local network with communication to the Internet through, for example, Internet Server 712. The shops may also share a common MMTR such as MMTR 718 for Mall Central 714 of the shopping mall. When in the mall, the CT/MD such as the CT/MD held by user 1 720 or the CT/MD held by user 2 722 operates on one or more channels in a local mode. The CT/MD may use one or more MMTR 708, 710, or 716 as shown by the multiple antennas on the CT/MD of user 1 720 or the CT/MD of user 2 722. At the same time the CT/MD such as with user 1 720 or user 2 722 may operate on one or more channels using a WSP 306 in FIG. 3, and have multiple antennas, as mentioned, to enable this mode. Individual web sites of shops are auto tunable and selectable for easy browsing either through MMTR, 708, 710, 718 or a WSP 306 in FIG. 3. Products and services may be viewed on, for example, the CT/MD held by user 720. Selections may be made, auto checkout is possible and record keeping is enabled. This combines virtual browsing of the aisles with online shopping convenience. Comparison to the goods or services of other vendors is enabled in the context of this invention.

When the CT/MD of, for example, user 720 is operating in the remote mode, access and transactions are enabled by the present invention through a WSP 306 in FIG. 3. In each case the software and protocols reside either on a local server 716 or Internet server 712. A customer may input his own value optimization factors to generate an algorithm to drive individual satisfaction on all factors.

Figure 8:
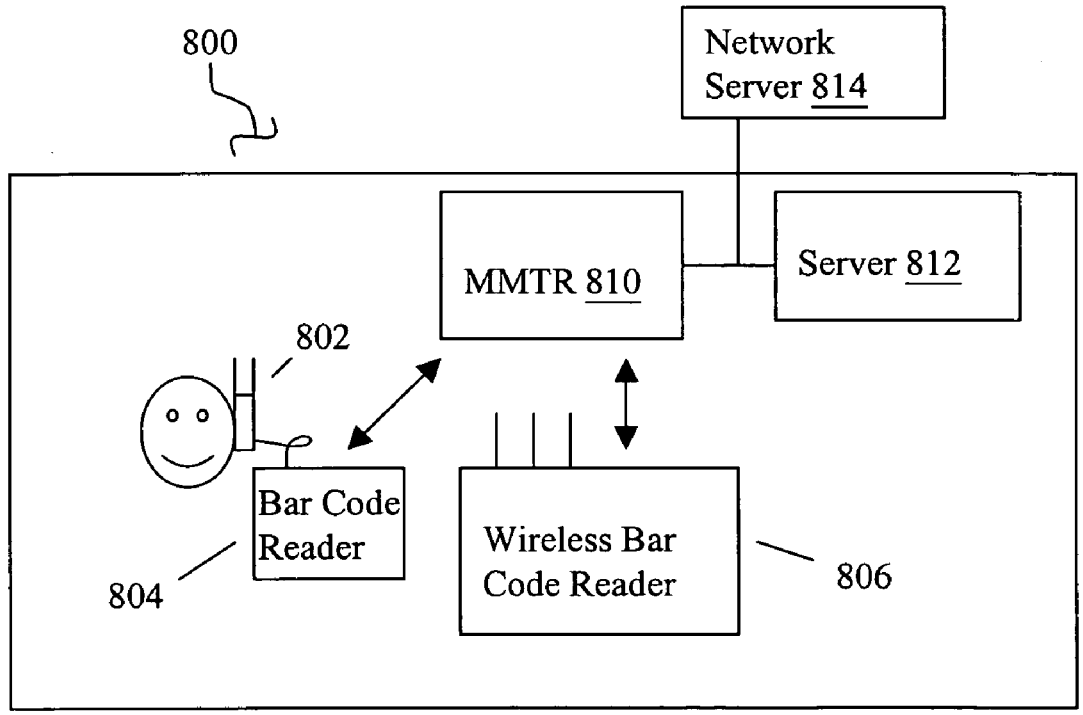
FIG. 8 is an embodiment of the mobile electronic commerce system of the present invention illustrating how an intelligent keyboard or CT/MD may be configured with a specialized input device such as an optical bar code reader.

FIG. 8 is an embodiment of the mobile electronic commerce system 800 of the present invention. In FIG. 8, an intelligent keyboard or CT/MD 802 may be configured with a specialized input device 804 such as an optical bar code reader. The specialized device 804 may be used for product identification entry/scanning and uses the essential features of the present invention as described above. This is valuable for grocery shopping and other shopping. Check out and payment may be automatic. Monthly, weekly tracking of purchases, analysis of purchases, pattern, inventory tracking and replenishment through the supply chain etc., may be automatic for the user and the vendor and supplier. Also, instead of the CT/MD 802, a stand alone specialized input device such as a wireless bar code reader 806 may be supplied to each shopper to perform these functions, such as by using the MMTR 810 and local server 812 or network server 814. The wireless bar code reader 806 is returned at checkout where it transfers the information on purchases to a server 812, 814 through the MMTR 810 and enables features such as automatic checkout and billing. Video and still images of products/services may be presented by a vendor on the CT/MD 802 on one or more channels while voice and data is on other channels of the CT/MD 802. The MMTR 810 function may be embedded in the CT/MD 802. In this embodiment of the present invention, customer profiles and photos may be supplied to, for example, a sales clerk for greeting, enhanced shopping and security using the CT/MD 802, the MMTR 810, server 812, 814 and software resident on the local server 812 or network server 814. A photo of a customer may be acquired real time and compared against a database, such as on local server 812. The sales clerk may access the data on an Intelligent Keyboard or CT/MD 802 for enhanced service and reduced fraud.

Figure 9:
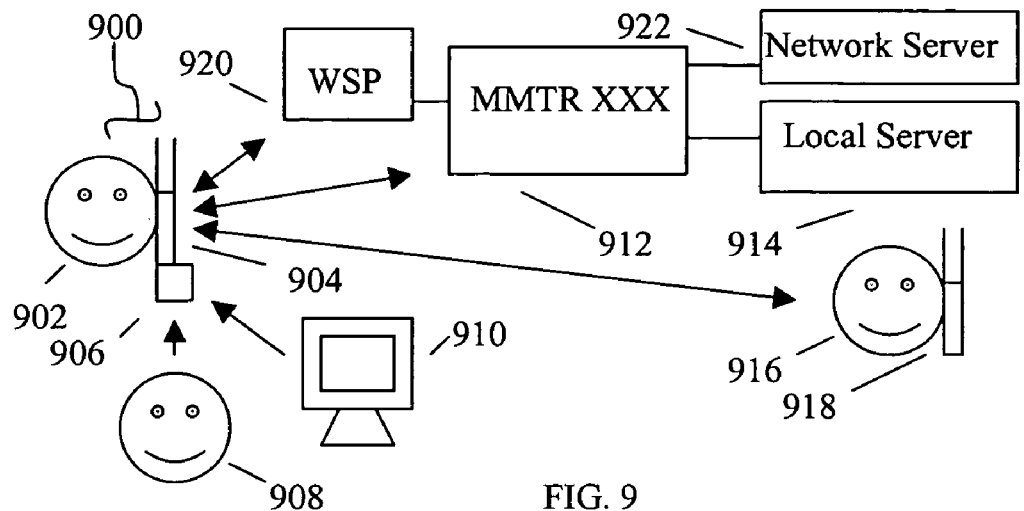
FIG. 9 is an embodiment of the mobile electronic commerce system of the present invention illustrating how consultation with another individual is facilitated either in a physical store or a virtual store.

FIG. 9 is an embodiment of the mobile electronic commerce system 900 of the present invention. In FIG. 9, shopping is often done in consultation with another individual 916 either in a physical store or a virtual store. The other person 916 whose input is needed may not be present. A CT/MD 904 used by a sales person 902 may acquire images, such as video photos of customer 908 or goods 910, using a built in camera or attachment 906. The CT/MD may send the photos by wired or wireless means with appropriate data and comments (text and verbal) to the other person 906 by way of, for example, CT/MD 918 to help in the purchasing process. An MMTR 912 and local server 914 or network server such as an Internet server 922 may be in the loop with or without a WSP 920. Thus the present invention enables decision makers 902, 908, 916 to fully compare all attributes and price in aiding the purchase decision.

Figure 10:
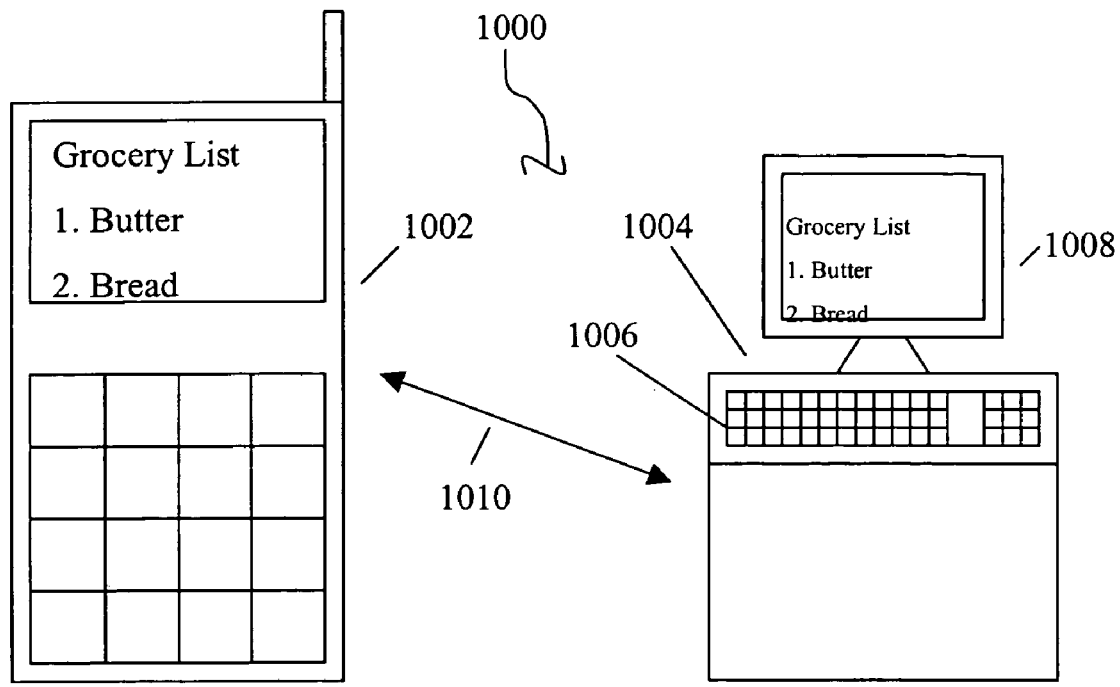
FIG. 10 is an embodiment of the mobile electronic commerce system of the present invention illustrating the use of user configurable lists.

FIG. 10 is an embodiment of the mobile electronic commerce system 1000 of the present invention. In FIG. 10, an important feature of the present invention is user configurable lists. The present invention enables configurable lists, and especially user configurable lists, with or without codes, on a CT/MD 1002. Shopping lists, grocery lists, To Do lists, address lists, cost lists, inventory lists, medication lists and other types of lists are needed by individuals and businesses. While the viewing these lists may be more convenient on a CT/MD 1002, data entry on a CT/MD 1002 poses a problem due to input limitations, such as the small keyboard. The present invention overcomes these limitations with individual customizable lists in the form of a configurable list. A configurable list of the present invention allows the user to input data on a PC 1004 or other device using a convenient input means, such as a large keyboard 1006. The number of columns and number of rows in the list are defined and named by the user such as on the PC monitor 1008. The user having defined one or more lists and named them appropriately may define numerical or alphanumeric codes to define the data in various fields. As an example the user might define a grocery list to track food shopping activity. This list may be defined, for example, with 5 columns and 20 rows. Column 1 may have the date, column 2 an item code, column 3 an item description, column 4 a quantity and column 5 may be a cost. Each row is a new entry. In addition, the user defines a list, and in this embodiment the defined list is called a code list. The code list cross references between the item description and its unique user defined code. The lists are then down loaded 1010 into the CT/MD 1002.

An example of this embodiment of the invention is shown in table 1, 2 and 3 of FIG. 10:

TABLE 1

| Code List | |
|---|---|
| Code | Description |
| 1 | Milk |
| 2 | Butter |
| 3 | Cheese |
| 4 | Toilet Paper |

The resulting Grocery List is shown below:

TABLE 2

| Grocery List | | | | |
|---|---|---|---|---|
| Date | Code | Description | Quantity | Cost |
| Sep. 12, 2000 | 1 | Milk | 1 gallon | 3.50 |
| Sep. 12, 2000 | 2 | Butter | 1 pound | 4.25 |
| Sep. 13, 2000 | 3 | Cheese | 2 pound | 2.79 |
| Sep. 14, 2000 | 4 | Toilet Paper | 12 rolls | 4.95 |

In a cell phone browser this data may be presented in one or more formats depending on screen size. One format may be:

TABLE 3

| Grocery List | |
|---|---|
| Date: Sep. 12, 2000 | |
| Code 1: | Milk |
| Qty: | 1 gallon |
| Cost: | $3.50 |
| Code 2: | Butter |
| Qty: | 1 pound |
| Cost: | $4.25 |
| Date: Sep. 13, 2000 | |
| Code 3: | Cheese |
| Qty: | 2 lbs |
| Cost: | $2.79 |
| Date: Sep. 14, 2000 | |
| Code 4: | Toilet Paper |
| Qty: | 12 rolls |
| Cost: | $4.95 |
| Month to date Expense: | |
| Milk: | $3.50 |
| Butter: | $4.25 |
| Cheese: | $2.79 |
| Toilet Paper: | $4.95 |
| Total: | $15.49 |

The data inputs may be auto filled by cross reference to the Code list. The quantity units may have a default auto fill unit or be selectable. The grocery list and the completed grocery purchases data may be tracked to determine spending patterns or for archival or other reasons by software that is resident on a local server or an Internet server.

This concept may be extended to other applications, for example, "To Do" lists, homework lists, "Action Item" lists, sales management, inventory, stock transactions to enable easy data entry or viewing with a CT/MD 1002. With the present invention, the CT/MD 1002 is extendable to tables and spreadsheets to, for example, generate customer defined spreadsheets.

The present invention also covers calculator functions, both standard and scientific, accessible using the software resident on the local server or Internet server. The calculator function in a CT/MD 1002 is needed in mobile e-commerce. The data entry task is simplified by having menu choices that define the function to be performed, such as addition or subtraction, and the data to be entered in sequence such that the mathematical operation is performed with only numerical key entries.

Spreadsheets require more complex manipulation and presentation of processed numbers. The present invention provides configurable spreadsheets, requiring the mathematical manipulation of various data in a field and for the results to be input into various fields, with field identification. A table of X rows and Y columns is generated forming individual cells in which data may be entered and operations such as addition, subtraction, and other mathematical functions performed on one or more cells. Each cell may be accessed first by selecting a row or column and then using the up and down function on the CT/MD 1002. Some cells may have a text header or content and other cells may have numbers only. The text may be entered as numerical codes by having a preset text to code number cross reference table. The value displayed in each cell is auto filled by the software on the server to show the number code and the corresponding text. This allows for easy data entry in numbers only. At the same time the separate code list may be viewed as needed to have the textual equivalent displayed. The CT/MD 1002 along with the software resident on a local server 914 in FIG. 9 and the MMTR 912 in FIG. 9 is thus enabled to execute spreadsheets and have it accessible from a CT/MD 1002. The CT/MD 1002 may also use an Internet server 922 in FIG. 9 and a WSP 920 in FIG. 9.

Figure 11:
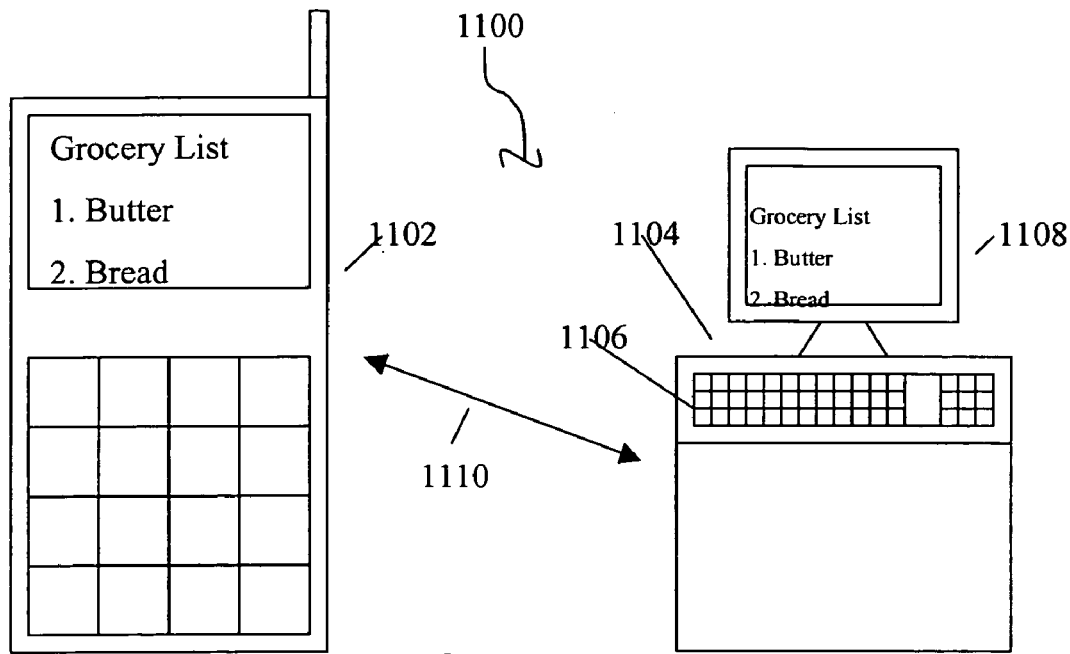
FIG. 11 is an embodiment of the present invention illustrating an external monitor or other display for facilitating the input and output of information.

FIG. 11 is an embodiment of the present invention illustrating an external monitor or other display 1100 for facilitating the input and output of information. In FIG. 11, a CT/MD 1102 has a grocery list, which is transmitted by a wireless or other link 1110 to a display elsewhere such as on a PC 1104 with conventional keyboard 1106 and full size display 1108.

Figure 12:
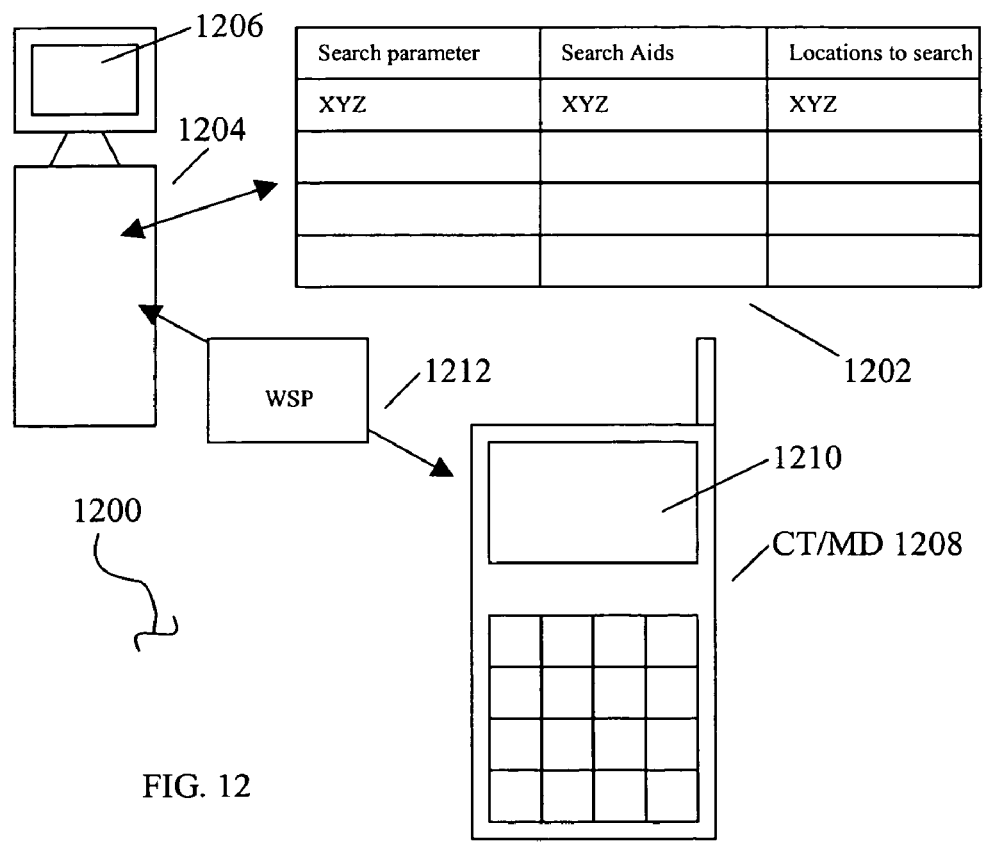
FIG. 12 is an embodiment of the present invention illustrating a search engine function.

FIG. 12 is an embodiment of the present invention illustrating a search engine function 1200. In FIG. 12, the search engine function 1200 uses search engine tables 1202 to find relevant data. This search is done, as an example, in the following manner:

a. User sets up his own search engine table 1202 of key words, subjects, sources or other parameters or combination of parameters. The search engine table 1202 is set up using a PC 1204 or some other entry device with a full function keyboard 1106 in FIG. 11. The PC 1204 has a display 1206, and uses one or more web sites 310 of FIG. 3 providing functionality, which may be later accessed by the CT/MD 1208.

b. Each search engine table is now accessible and viewable on the CT/MD 1208 to conduct one or more parametric searches by simply selecting up and down scroll function on the CT/MD 1208. There may be a search engine table 1202 for key words and a search engine table 1202 for subjects and similar search engine tables. There can be a search engine table 1202 that is customized to the individual user needs that has a combination of parameters.

c. User selects the parameter of interest from the appropriate table and launches a search engine function 1200 by selecting a "SEARCH" function in a browser in the CT/MD 1208 on the CT/MD display 1210.

d. The software and protocols resident on the local server 914 in FIG. 9 or Internet server 922 in FIG. 9 are available through wireless service provider (WSP) 1212 to launch the search function on, for example, the world wide web on web sites 310 of FIG. 3.

Method 2: Requiring no text but using numerical input for the search tables 1202.

This search is done, as an example, in the following manner:

a. User sets up his own search engine table 1202 of key words, subjects, sources or other parameters or combinations of parameters and assigns numbers to each parametric value. As an example the word "money" may be assigned the number 1, the word "books" may be assigned number 2 and so on. The search engine table 1202 has a parametric value in text and a corresponding unique numerical value. There is a look up table relationship set up to automatically map parametric words to numbers and the reverse. The search engine tables 1202 are set up using a personal computer 1204 or some other device with a full function keyboard 1106 on FIG. 11 and using one or more web sites 310 of FIG. 3 that provide the functionality to be later accessed by the CT/MD 1208.

b. Each search engine table 1202 and its associated mapping of text to numbers is now accessible and viewable on the CT/MD 1208. The user may conduct one or more parametric searches by simply selecting up and down scroll functions on the CT/MD 1208 and inputting unique numerical values. There may be search engine tables 1202 for key words and search engine tables 1202 for subjects or similar search engine tables 1202 with associated mapped numerical values. There can be a search engine table 1202 that is customized to the individual users needs with a combination of parameters and numbers.

c. User selects the parameter of interest from the appropriate table, inputting a numerical value, and launches the search engine function 1200 by selecting the "SEARCH" function in the CT/MD 1208 browser in display 1206.

d. The software and protocols resident on a local server 914 of FIG. 9 or Internet server 922 of FIG. 9 launch the search function on, for example, the world wide web on web sites 310 of FIG. 3.

In the present invention two distinct methods of conducting web based searches use limited or no textual inputs on a CT/MD 1208 or only numerical inputs. The present invention enables the user to set up a customized search engine 1200 for a CT/MD 1208 or other computing device to enhance mobile e-commerce or for related applications.

In addition, the software and protocols resident on a local server 914 or Internet server 922 may be programmed to learn the search needs and patterns to artificially learn the user's search behavior, preferences and search patterns. This feature will generate a customized and dynamically responsive artificial intelligence search engine function 1200 for various applications.

Method 3. Search by deciphering numerical entries into possible word associations:

a. The input of numbers is preferable on a cellular or PCS telephone such as a CT/MD 1208 as opposed to words, since words require that more data be entered.

b. The word SEARCH, as an example, requires the input of only numbers in the present invention, and is accomplished as below:

S would normally require a depression of the 7 key three times.

E would require the depression of the 3 key two times.

A would require the depression of the 2 key one time.

R would require the depression of the 7 key two times.

C would require the depression of the 2 key three times.

H would require the depression of the 4 key two times.

A search engine table 1202 of possible desired words is generated if the keys are pressed only once for a chosen letter on the numerical key. In the case of SEARCH by pressing the key only once there are a number of possible words, or, if preferred, the number 7 might be pressed three times to bring up a lookup table of words beginning with "S". The software and protocols resident on a local server 914 of FIG. 9 or Internet server 922 of FIG. 9 will generate a search engine table 1202 of possible words. A separate software algorithm resident on a local server 914 of FIG. 9 or Internet server 922 of FIG. 9 parses the search engine table 1202 data to generate intelligent choices of words that best suit the intention of the user. These choices are based on the profile of the user and generally accepted intentions of most users. The set of words is presented on the cell phone browser such as CT/MD 1208 display 1210 or by voice prompt. The user then makes a choice. The software is also set to make a default choice for the user.

The search is initiated automatically based on the default choice or by selection of the up and down menu bar in the manual mode. The search results are then presented to the CT/MD 1208 without having to type in a word and using only numerical inputs.

Figure 13:
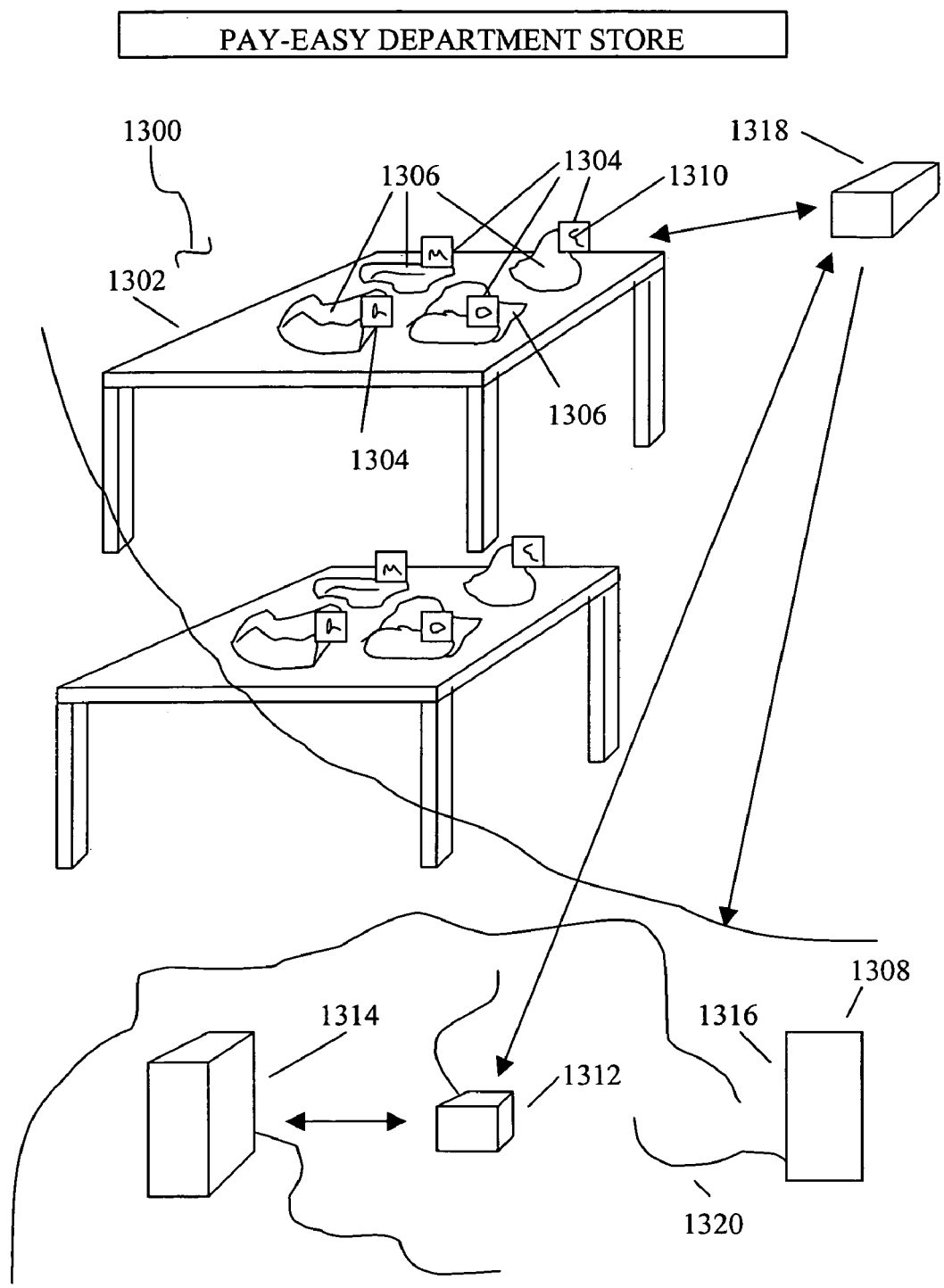
FIG. 13 is an embodiment of the present invention for mobile electronic commerce.

FIG. 13 is an embodiment of the present invention illustrating an apparatus for mobile electronic commerce 1300. In FIG. 13, the shopping experience requires that the user take a number of proactive steps in the process of selection of items on shelf or table 1302 for payment and checkout. There is a need to seamlessly automate these steps using a CT/MD 904 in FIG. 9. The present invention includes a smart wireless tag 1304 that may be attached or clipped or hidden in the item 1306 or made inconspicuous or prominent depending on the application, value of the item and type of item itself. The smart wireless tag 1304 is continuously on, or may go selectively into a power down mode (for example, when the store is closed), and transmits using low power consumption circuitry. The smart wireless tag 1304 may have only a transmitter, only a receiver or both depending on need. In addition the smart wireless tag 1304 may be line powered for certain applications. The shrinking size of radio frequency and other electronic functions and integrated circuits allows a small smart wireless tag 1304 that will fit into a number of applications. Each smart wireless tag 1304 has a unique identification (ID) 1310. The ID 1310 defines the type of item 1306 and other factors as required.

Any attempt to remove the item 1306 by the customer, from a predefined control zone 1308 under the supervision of a zone controller 1318 will result in audible or other notification to the sales clerk or vendor 902 in FIG. 9. The control zone 1308 may be defined to be either very small or very large. Each control zone 1308 has an area of coverage. In a control zone 1308 with a small area of coverage, the power used by the smart wireless tag 1304 is small and battery size may be small. The electronics and battery for a smart wireless tag may be designed to fit various applications and needs. Within the range of one or more control zones 1308 are located one or more MMTRs 1312 and a local server 1314, though an Internet server 1316 connected through Internet connection 1320 may also be used. The software and protocols resident on the server 1314, 1316 keeps track of the one way or two way communications from a number of smart wireless tags 1304 in a store.

Having smart wireless tags 1304 allows for continuous tracking of inventory and physical assets that are tagged, and has other applications in the home environment, shopping, industry and generally. In addition, when the item 1306 is removed intentionally or otherwise, it is easy to track the movement and have alerts set. As an example when the item 1306 is sold, it may be auto checked and payment received directly, inventory adjusted, new orders placed for restocking and for other purposes. The smart wireless tag 1304 may be deactivated or removed when the item 1306 leaves the control zone 1308.

The smart wireless tag 1304 in conjunction with the CT/MD 1302 may obviate the need for barcode attachments and other checkout scanners. When the customer is within the control zone and transmitting using a smart wireless tag, the item specific data may be received by the CT/MD 1302 to access all attributes, including price. The item may be auto added to a shopping list. The CT/MD 1302, when in the physical location, will query the store inventory using an MMTR 1312 and servers 1314, 1316 to find out where certain items are located, price and other factors and to do an auto check out. When the CT/MD 1302 is not in the store the CT/MD 1302 user may access the store database and check inventory or make on line purchases.

In some cases the customer may wish to use a smart wireless tag 1304 to have that particular item programmed into his own control zone 1306, such as a home, to include the item in an inventory/asset database. This can be done wherever the home, office or industry has its own MMTR 1312 and access to a server 1314, 1316.

Thus in the present invention the MMTR 1312 in association with the smart wireless tag 1304 and a local server 1314 or an Internet server 1316 may be used for various applications to deter theft, to track items and assets, and for other purposes.

Figure 14:
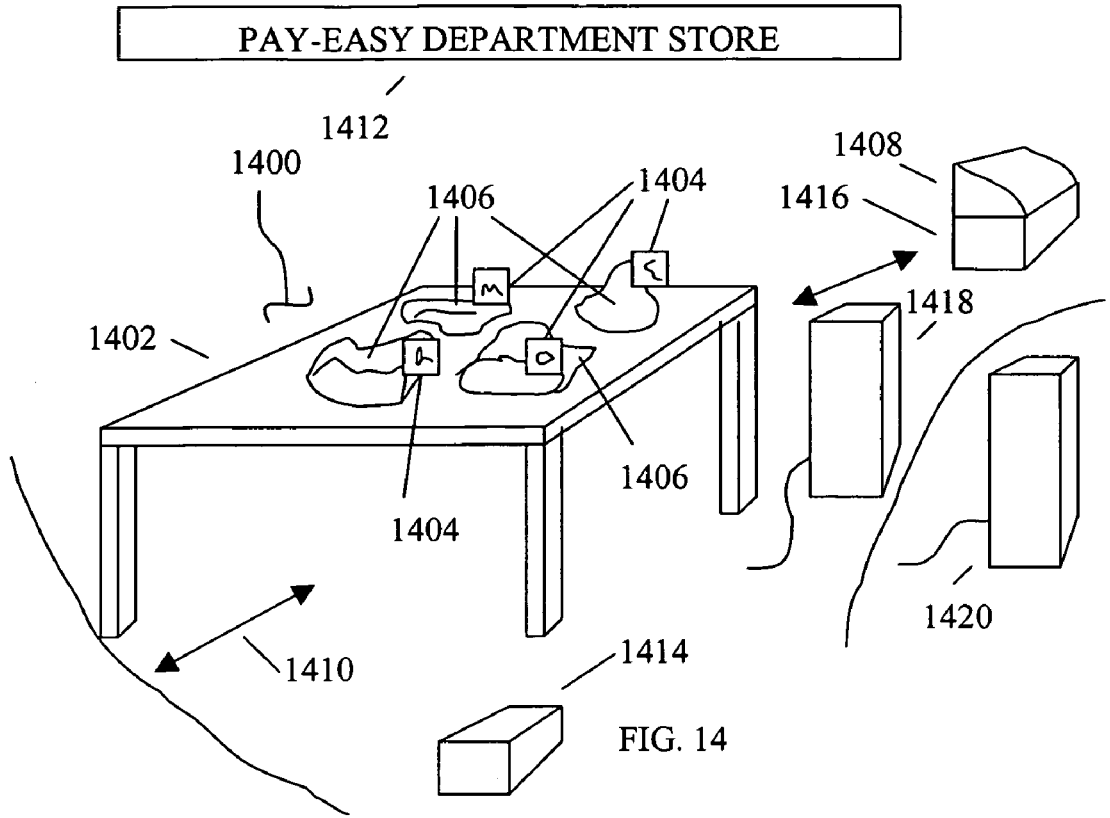
FIG. 14 is an embodiment of the apparatus for mobile electronic commerce of the present invention, which enables a store to be fitted with a wired or wireless zone controller.

FIG. 14 is an embodiment of the apparatus for mobile electronic commerce 1400 of the present invention. FIG. 14 enables each display shelf or table 1402 and checkout counter or cash register 1404 in a store 1406 to be fitted with a wired or wireless zone controller 1408, which may be line or battery powered. The purpose of the zone controller 1408 is to track items and other parameters existing in its zone of influence 1410, such as a zone in the store 1412 shown as the "Pay-Easy" Department Store. The zone controller 1408 is able to communicate with various items in its zone 1410, such as smart wireless tags 1404 affixed to the items 1406. The zone controller 1408 may have an MMTR 1416 function built-in to allow it to be part of a larger network in the store 1412. The larger network in the store 1412 may have a central MMTR 1414 that communicates and controls the local zone controllers such as zone controller 1408. Customer 902 of FIG. 9 or sales clerk 908 of FIG. 9 may make inputs on the zone controller 1408 to conduct various transactions including automatic purchases and payment. The zone controller 1408 may work in association with the customer's CT/MD such as CT/MD 904 of FIG. 9 to conduct various automatic transactions or is capable of being used directly via a keyboard. An example of such a keyboard is intelligent keyboard 1006 of FIG. 10 or the user may use other types of input and output methods. The central MMTR 1414 in conjunction with a local server 1418 and/or Internet server 1420 communicates and controls all functions in the store 1412. These functions of the store 1412 include the various zone controllers such as zone controller 1408 and enables communication outside the store 1412 to CT/MDs such as CT/MD 904 of FIG. 9 or other networks.

Figure 15:
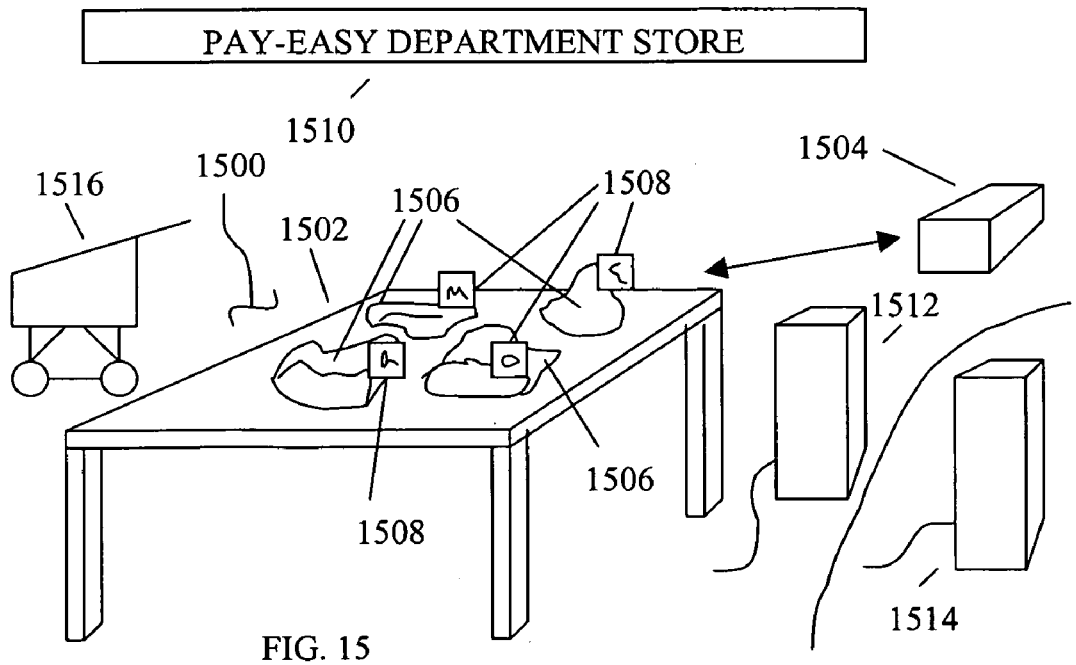
FIG. 15 is an embodiment of the present invention implemented in a department store, which has various display tables and shelves fitted with zone controllers.

FIG. 15 is an embodiment of the present invention implemented in a department store 1500. In FIG. 15, the store 1500, which is shown as "Pay-Easy" Department Store 1510, has various display tables 1502 and shelves fitted with zone controllers 1504. The store 1500 has items 1506 on the display table 1502 or shelf. The items 1506 are affixed with smart wireless tags 1508. Each item 1506 is under the control of a local zone controller 1504. Each zone controller 1504 is in wireless communication and is under the control of a central MMTR 1414 of FIG. 14 and a local server 1512 or network server such as an Internet server 1514.

The software resident on the servers 1512, 1514 enables the items 1506 and other parameters to be tracked and analyzed automatically. Full wireless control down to every individual item 1506 exists within the store 1500. The store 1500 MMTR 1504 is in an outside-the-store communication loop. The ability to track every individual item 1506 exists both within and outside the store 1500 if required, including items such as shopping cart 1516.

HOW Mobile Purchasing May be Done:

Case 1: When in the store model. The buyer walks into the store and looks at the display table or display shelf. Each display has items with smart wireless tags affixed. Each smart wireless tag has a unique identification (ID) associated with it describing the product, attributes and price.

The display may have a zone controller associated with it. Customer may choose an item using the CT/MD or manual entry on the zone controller to add the item to a shopping cart. The CT/MD is recognized as being preapproved to make purchases. The pertinent data relating to the CT/MD such as account number, credit card information and other factors are set once in the customer profile and are available on a server which is accessible via the MMTR. The customer account is auto charged. The item is entered into the database as having been sold allowing the permission to be set for removal from the store. The store inventory is auto adjusted and decreased for that item, the supplier is automatically notified and orders placed for that item and the delivery is scheduled. In turn the manufacturer may automatically schedule production. The entire sales and supply process may be fully automatic in accordance with the present invention, and may be fully or partially wireless. The software and protocols resident on local servers or Internet servers enable the total management of the complete supply chain and delivery chain.

Out of Store Model:

In a similar fashion the CT/MD or a stationary device may be used from outside the store to query the availability of items in one or more stores or sites. This query may go down to the individual item level. The connection of the CT/MD to the individual item is through the store MMTR and servers and the software resident on these servers. The query of the CT/MD results in polling each store for pricing and availability and computing the optimal acquisition, including such factors as color, size, shipping, delivery, order placement and order fulfillment based on the preset or dynamic user defined value algorithms. The software and user defined algorithms reside on one or more servers. Store transactions delivering the full range of customer satisfaction may be conducted by wired or wireless means using a device such as the IK/CT/MD, a central MMTR, servers and the software, protocols and value optimizing algorithms resident on various servers.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for real time mobile commerce transactions comprising:

receiving a selected transaction request transmitted from a mobile device to a central server, wherein the selected transaction request comprises an information search request, an information acquisition request, an information comparison request, a price request, a price comparison request, a transaction instruction request, and a transaction execution request, and wherein transmitting the selected transaction request comprises, transmitting using a keyboard, transmitting using audible speech, and transmitting visual data, comprising data in a touch screen enabled display panel format;

receiving in the mobile device information from a coupled wireless bar code reader, wherein the information comprises at least one of product identification information, product feature information, and price information, and wherein the wireless bar code reader reads the information from a bar code chosen from a group comprising a bar code on an item in proximity to the wireless bar code reader and a bar code referring to an item not in proximity to the wireless bar code reader, wherein the coupled wireless bar code reader is one of integrated in the mobile device, and collocated with the mobile device;

setting up at least one customized search engine table to conduct a search by selecting a parameter of interest from the table, wherein the search engine table is set up by a user of the mobile device;

querying at least one server regarding the selected transaction request in response to receiving the selected transaction request wherein the server uses a lookup table and a stored user profile to set an environment specific to the user for the selected transaction request;

receiving a response to the query from the at least one server;

processing the received response, including formatting the received response;

transmitting the processed response to the mobile device, such that the mobile device receives the response in one of a plurality of formats comprising an audible data format, and a visual data format including a touch screen enabled display panel format; and executing a transaction in response to a received transaction execution request, including communicating with the at least one server using data received from the mobile device, and further comprising automatic payment using the wireless bar code reader device information, automatically entering an item in an inventory database as sold, enabling the item to be removed from a store, wherein the transaction execution request can be transmitted from a remote position and local position relative to the store.

2. The method of claim 1, wherein the automatic payment includes payment directly charged to an account maintained by the user with a service provider or payment by debiting an amount from an account maintained by the user within the mobile device.

3. The method of claim 1, wherein the mobile device further comprises a user customizable list in the form of a configurable list which is imputed on a PC or other convenient input means and down loaded onto the mobile device.

4. The method of claim 1, wherein a local server or internet server is programmed to learn search needs and patterns to artificially learn the user's search behavior, preferences and search patterns and generate a customized and dynamically responsive artificial intelligence search engine function.

5. The method of claim 1, wherein value optimization factors of a user are inputted to generate an algorithm to drive individual satisfaction on all factors.

6. The method of claim 1, wherein at the server, a matching routine allows a desired action to be parsed into a more suitable-form for processing, including language conversion.

7. The method of claim 1, further comprising auto adjusting and decreasing store inventory for a sold item and automatically notifying a supplier, placing an order for the item and scheduling delivery of the item.

8. The method of claim 1, further comprising updating the user profile with information relating to the user.

9. The method of claim 1, wherein at least one flag may be set for regularly interrogating a site and notifying the user of an event triggering a need which has been expressed by the user.

10. A method for real time mobile commerce transactions comprising:
  receiving a selected transaction request transmitted from a mobile device to a central server, wherein the selected transaction request comprises an information search request, an information acquisition request, an information comparison request, a price request, a price comparison request, a transaction instruction request, and a transaction execution request, and wherein transmitting the selected transaction request comprises, transmitting using a keyboard, transmitting using audible speech, and transmitting visual data, comprising data in a touch screen enabled display panel format;
  receiving in the mobile device information from a radio frequency identification (RFID) tag, wherein the information received from the RFID tag comprises at least one of product identification information, product feature information, price information, product availability information, shipping information and payment information;
  setting up at least one customized search engine table to conduct a search by selecting a parameter of interest from the table, wherein the search engine table is set up by a user of the mobile device and wherein at least one flag may be set for regularly interrogating a site and notifying the user of an event triggering a need which has been expressed by the user;
  querying at least one server regarding the selected transaction request in response to receiving the selected transaction request wherein the server uses a lookup table and a stored user profile to set an environment specific to the user for the selected transaction request;
  receiving a response to the query from the at least one server;
  processing the received response, including formatting the received response;
  transmitting the processed response to the mobile device, such that the mobile device receives the response in one of a plurality of formats comprising an audible data format, an alpha numeric data format and a visual data format including a touch screen enabled display panel format; and
  executing a transaction in response to a received transaction execution request, including communicating with the at least one server using data received from the mobile device, and further comprising automatic payment using the RFID tag information, automatically entering an RFID tagged item in an inventory database as sold, enabling the item to be removed from a store, wherein the transaction execution request can be transmitted from a remote position and local position relative to the store.

11. The method of claim 10, wherein a zone controller causes an audible or other notification to a sales clerk or vendor if a customer attempts to remove or add an item from a predefined control zone under the supervision of the zone controller.

12. A method for real time mobile commerce transactions comprising:
  configuring a mobile device for computation, command, control and communication of voice and data information;
  the mobile device communicating with a server to transmit and receive data via at least one network using at least one of wired and wireless communication methods using at least one communication protocol on at least one channel of the mobile device, wherein transmitting comprises, transmitting using a keyboard, transmitting using audible speech, and transmitting visual data that comprises data in a touch screen enabled display panel format; and wherein receiving comprises, receiving using audible speech, using voice, using sound, and receiving using visual data that comprises data in a touch screen enabled display panel format;
  receiving transaction information from a plurality of merchant web sites and associated merchant servers wherein the information comprises at least one of product description, product features, product configuration, pricing, shipping, delivery, inventory, payment terms and transaction terms, wherein receiving further comprises receiving in the mobile device information from a coupled RFID tag reader, wherein the information comprises at least one of product identification information, product feature information, and price information, and wherein the RFID tag reader reads the information from a RFID tag chosen from a group comprising an item in proximity to the RFID tag reader and referring to an item not in proximity to the RFID tag reader, wherein the coupled RFID tag reader is one of integrated in the mobile device, and collocated with the mobile device;
  setting up at least one customized search engine table to conduct a search by selecting a parameter of interest from the table, wherein the search engine table is set up by a user of the mobile device;
  communicating a first transaction request from the mobile device to at least one server related to a first item and archiving data related to the communication in at least one of a lookup table and a database in the mobile device wherein the server uses a lookup table and a stored user profile to set an environment specific to the user for the selected transaction request;
  receiving at least one response to the first transaction request from the at least one server related to the first item and archiving data related to the at least one response in at least one of a lookup table and a database in the mobile device;

comparing the transaction request to the at least one server with the transaction response from the at least one server in conjunction with user defined rules, and storing resulting information in at least one of a lookup table and a database in the mobile device, wherein the comparing is executed in one or more of the mobile device and a server located on the at least one network;

comparing the information provided by the at least one server with information provided by at least one others server for a selected user defined utility, wherein the comparing is executed in one or more of the mobile device and a server located on the at least one network;

evaluating and selecting a server of the at least one servers based on the comparing for execution of a selected transaction related to a selected item, wherein the selection is based on user defined criteria of the comparing for acquisition of a particular item;

communicating a transaction request for the selected transaction to the selected server from the mobile device; and executing the selected transaction request with the mobile device in conjunction with the selected server, wherein the execution includes at least one payment method selected from a list comprising payment by credit card, payment by a check, payment by debit card, payment via direct debit to a bank account, payment directly charged to an account maintained by the user with the service provider, and payment by debiting an amount from an account maintained by the user within the mobile device, executing further comprising automatic payment using the RFID tag reader device information, automatically entering an item in an inventory database as sold, enabling the item to be removed from a store, wherein a transaction execution request can be transmitted from a remote position and local position relative to the store.

13. The method of claim 12, wherein the mobile device further comprises a camera for acquiring images of the user and goods, and the mobile devices sends the images to the server or a third party to assist in the purchasing process.

14. The method of claim 1 wherein the wireless bar code reader device comprises at least one of an optical bar code reader and a radio frequency (RF) bar code reader.

* * * * *